United States Patent
Maeda et al.

(10) Patent No.: US 8,210,685 B2
(45) Date of Patent: Jul. 3, 2012

(54) PROJECTION DISPLAY APPARATUS

(75) Inventors: Makoto Maeda, Osaka (JP); Ken Mashitani, Hirakata (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 374 days.

(21) Appl. No.: 12/554,587

(22) Filed: Sep. 4, 2009

(65) Prior Publication Data

US 2010/0053478 A1    Mar. 4, 2010

(30) Foreign Application Priority Data

Sep. 4, 2008 (JP) .................................. 2008-226828
Sep. 18, 2008 (JP) .................................. 2008-239915

(51) Int. Cl.
*G03B 21/14* (2006.01)
*H04N 9/31* (2006.01)
(52) U.S. Cl. ............................. 353/20; 353/88; 348/758
(58) Field of Classification Search .................. 353/89, 353/20, 31, 88, 81, 82, 94, 33, 34, 37; 348/758; 349/5, 7, 8, 9
See application file for complete search history.

(56) References Cited

U.S. PATENT DOCUMENTS

| 2004/0135977 A1* | 7/2004 | Ito et al. | 353/122 |
| 2005/0237494 A1* | 10/2005 | Belliveau | 353/87 |
| 2008/0100804 A1* | 5/2008 | Kanayama et al. | 353/20 |

FOREIGN PATENT DOCUMENTS

JP    2002-287247 A    10/2002

* cited by examiner

*Primary Examiner* — William C Dowling
*Assistant Examiner* — Ryan Howard
(74) *Attorney, Agent, or Firm* — Marvin A. Motsenbocker; Mots Law, PLLC

(57) ABSTRACT

A projection display apparatus includes: a red imager; a green imager; a blue imager; a polarization adjusting element; a color combining unit; and a controller. A superimposed component light enters the polarization adjusting element together with the fourth color component light. The polarization adjusting element transmits the superimposed component light, whereas transmitting the fourth color component light by adjusting the polarization of the fourth color component light in accordance with switching between a low voltage applied state and a high voltage applied state. The controller controls re-orienting operation of applying a high voltage to the polarization adjusting element.

9 Claims, 12 Drawing Sheets

HIGH VOLTAGE APPLIED STATE

LOW VOLTAGE APPLIED STATE

FIG. 10

| | | POLARIZATION ADJUSTING ELEMENT | | | POLARIZING PLATE ON INCIDENT SIDE |
|---|---|---|---|---|---|
| | COLOR COMPONENT LIGHT | INCIDENT LIGHT | EMITTED LIGHT | | |
| | | | HIGH VOLTAGE APPLIED STATE | LOW VOLTAGE APPLIED STATE | |
| TYPE (1) | Ye | P POLARIZATION | P POLARIZATION | S POLARIZATION | TYPE (1) (P POLARIZATION: TRANSMITTING S POLARIZATION: SHIELDING) |
| | G | | P POLARIZATION | P POLARIZATION | |
| TYPE (2) | Ye | | S POLARIZATION | P POLARIZATION | TYPE (2) (S POLARIZATION: TRANSMITTING P POLARIZATION: SHIELDING) |
| | G | | P POLARIZATION | P POLARIZATION | |
| TYPE (1) | Ye | S POLARIZATION | S POLARIZATION | P POLARIZATION | TYPE (1) (P POLARIZATION: TRANSMITTING S POLARIZATION: SHIELDING) |
| | G | | S POLARIZATION | S POLARIZATION | |
| TYPE (2) | Ye | | P POLARIZATION | S POLARIZATION | TYPE (2) (S POLARIZATION: TRANSMITTING P POLARIZATION: SHIELDING) |
| | G | | S POLARIZATION | S POLARIZATION | |

▓ ... Ye = OFF

PROJECTION DISPLAY APPARATUS

CROSS REFERENCE TO RELATED APPLICATIONS

This application is based upon and claims the benefit of priority from prior Japanese Patent Application No. 2008-226828, filed on Sep. 4, 2008 and prior Japanese Patent Application No. 2008-239915, filed on Sep. 18, 2008; the entire contents of which are incorporated herein by reference.

BACKGROUND OF THE INVENTION

1. Field of the Invention

The present invention relates to a projection display apparatus utilizing a red component light, a green component light, a blue component light, and additionally, a fourth color component light.

2. Description of the Related Art

Conventionally, there has been known a projection display apparatus including three imagers for lights of three colors, a cross dichroic cube for combining lights emitted from the three imagers, and projection unit for projecting the lights combined by the cross dichroic cube.

Here, the cross dichroic cube has three light incidence surfaces which lights respectively enter, and one light emitting surface from which the lights exit. Therefore, one cross dichroic cube is enough for the projection display apparatus if lights entering the cross dichroic cube are of three colors.

Meanwhile, a projection display apparatus utilizing lights of four or more colors has been proposed for the purpose of improving color reproducibility or luminance. For example, one projection display apparatus utilizes orange, yellow or cyan in addition to three colors of red, green, and blue so as to improve color reproducibility or luminance (see Japanese Patent Publication No. 2002-287247, for example).

Here, when a projection display apparatus utilizes lights of four or more colors, only one cross dichroic cube cannot combine the lights of four or more colors. Hence, the projection display apparatus needs to have two or more dichroic cubes (or cross dichroic cubes).

For example, when lights of four colors are needed to be combined, a projection display apparatus firstly acquires two combined lights, each of which is formed by combining lights of two colors, and then combines the two combined lights to acquire a combined light of four colors. Alternatively, the projection display apparatus may acquire a combined light of four colors by acquiring a combined light of three colors, and combining the combined light with a light of one color. The projection display apparatus may also acquire a combined light of four colors by acquiring a combined light of two colors, and combining the combined light with lights of the other two colors.

In these cases, two or more dichroic cubes (or cross dichroic cubes) need to be provided between imagers and projection unit. This makes the back focus of the projection unit longer.

As a result of this, since projection unit used in a projection display apparatus utilizing lights of three colors cannot be used for another type of projection display apparatus, cost of the projection display apparatus as a whole rises.

SUMMARY OF THE INVENTION

In a first aspect, a projection display apparatus includes: a red imager configured to modulate a red component light according to a red input signal; a green imager configured to modulate a green component light according to a green input signal; a blue imager configured to modulate a blue component light according to a blue input signal; a polarization adjusting element configured to adjust polarization of a fourth color component light; a color combining unit configured to combine lights emitted respectively from the red imager, the green imager, and the blue imager; and a controller configured to control a voltage to be applied to the polarization adjusting element. A superimposed component light, which is any one of the red component light, the green component light, and the blue component light, enters the polarization adjusting element together with the fourth color component light. The polarization adjusting element transmits the superimposed component light, whereas transmitting the fourth color component light by adjusting the polarization of the fourth color component light in accordance with switching between a low voltage applied state and a high voltage applied state of the polarization adjusting element. The controller controls re-orienting operation of applying a high voltage to the polarization adjusting element.

In the first aspect, the red input signal, the green input signal, and the blue input signal are inputted in each frame. The controller performs the re-orienting operation in each frame.

In the first aspect, the superimposed component light and the fourth color component light emitted from the polarization adjusting element enter a specific imager which is one of the red imager, the green imager and the blue imager corresponding to the superimposed component light. In the high voltage applied state, the polarization of the fourth color component light entering the specific imager is aligned with the polarization of the superimposed component light. When the low voltage applied state lasts more than a predetermined period of time, the controller performs the re-orienting operation in a frame where luminance should take precedence over color reproducibility.

In the first aspect, the superimposed component light and the fourth component light emitted from the polarization adjusting element enter a specific imager which is one of the red imager, the green imager, and the blue imager corresponding to the superimposed component light. In the high voltage applied state, the polarization of the fourth color component light entering the specific imager differs from the polarization of the superimposed component light. When the low voltage applied state lasts more than a predetermined period of time, the controller performs the reorienting operation in a frame where color reproducibility should take precedence over luminance.

In a second aspect, a projection display apparatus includes: a red imager configured to modulate a red component light according to a red input signal; a green imager configured to modulate a green component light according to a green input signal; a blue imager configured to modulate a blue component light according to a blue input signal; a polarization adjusting element configured to adjust polarization of a fourth color component light; a color combining unit configured to combine lights emitted respectively from the red imager, the green imager, and the blue imager; and a controller configured to control a voltage to be applied to the polarization adjusting element. A superimposed component light, which is any one of the red component light, the green component light, and the blue component light, enters the polarization adjusting element together with the fourth color component light. The polarization adjusting element transmits the superimposed component light, whereas transmitting the fourth color component light by adjusting the polarization of the fourth color component light in accordance with switching between a low voltage applied state and a high voltage applied state of the polarization adjusting element. The controller applies a voltage to the polarization adjusting element in a predetermined preparation period for adjusting a condition of the polarization adjusting element.

In the second aspect, in the predetermined preparation period, the controller performs standby display indicating that the projection display apparatus is in the predetermined preparation period, by using a color component light emitted from at least one of the red imager, the green imager, and the blue imager.

In the second aspect, any of the color component lights other than the fourth color component light is used for the standby display.

In the second aspect, the superimposed component light and the fourth component light emitted from the polarization adjusting element enter a specific imager which is one of the red imager, the green imager, and the blue imager corresponding to the superimposed component light. The controller gradually increases a dimming width of the fourth color component light in a predetermined conditioning period following the predetermined preparation period. The dimming width of the fourth color component light is a difference between a light amount of the fourth color component light emitted from the specific imager in the low voltage applied state and a light amount of the fourth color component light emitted from the specific imager in the high voltage applied state.

In the second aspect, the controller starts the predetermined preparation period when a power cable for supplying power is connected to the projection display apparatus.

BRIEF DESCRIPTION OF THE DRAWINGS

FIG. 10 is a table showing functions of the polarization adjusting element 50Ye according to the first embodiment.

DESCRIPTION OF THE PREFERRED EMBODIMENTS

Figure 1:
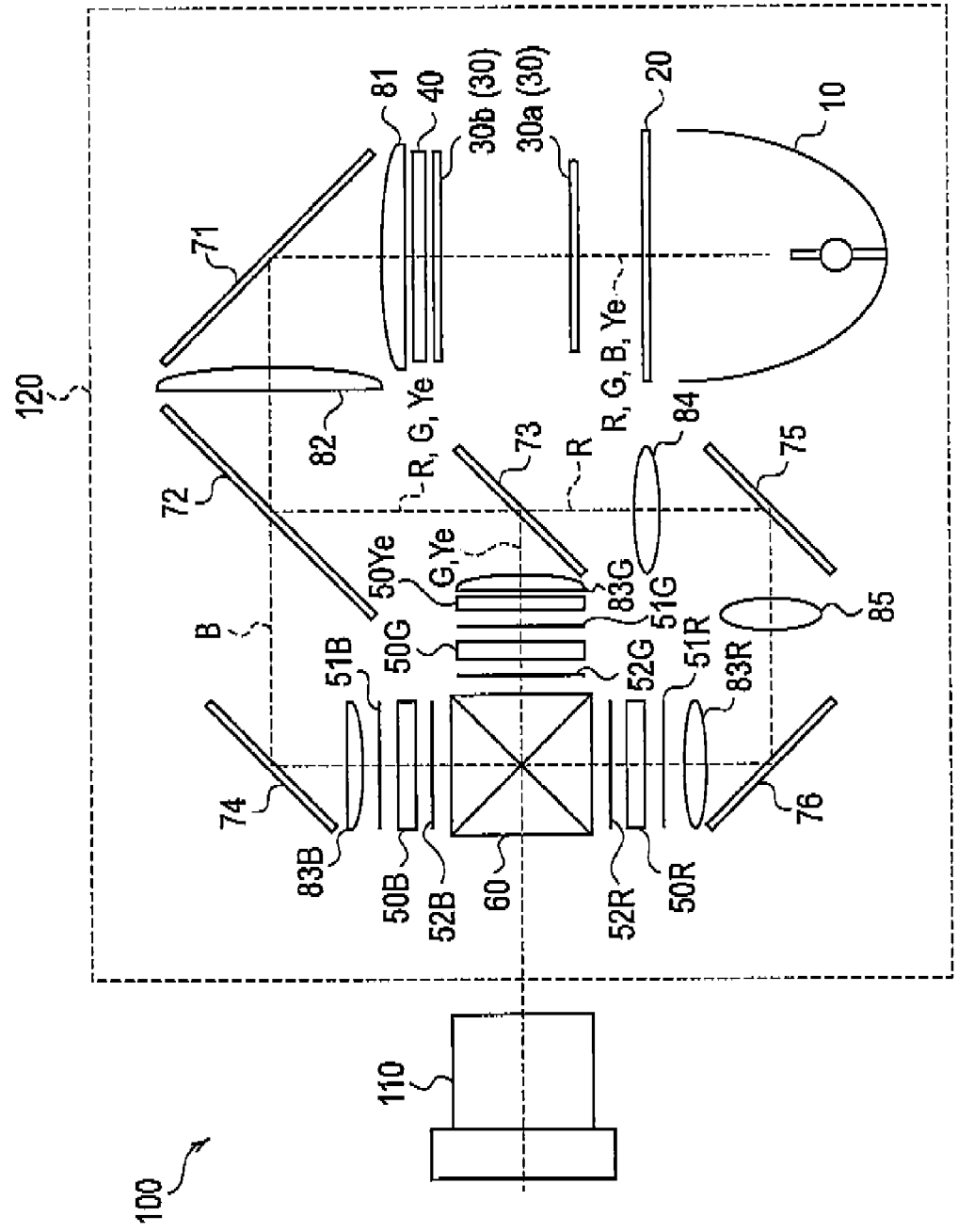
FIG. 1 is a view showing a configuration of a projection display apparatus according to a first embodiment.

Hereinafter, a projection display apparatus according to some embodiments of the present invention will be described with reference to the drawings. Note that, in the following description of the drawings, the same or similar reference numerals are given to the same or similar components.

However, it should be noted that the drawings are schematic and the ratio of each dimension differs from actual ratio. Therefore, specific dimensions and the like should be determined by taking the following description into consideration. Moreover, needless to say, dimensional relationships or ratios of components may also be different between the drawings.

Overview of Embodiments

Firstly, a projection display apparatus according to each of embodiments utilizes a yellow component light, in addition to a red component light, a green component light, and a blue component light. The yellow component light enters a polarization adjusting element together with the green component light. The green component light and the yellow component light emitted from the polarization adjusting element enter a green imager.

The polarization adjusting element transmits the green component light without adjusting polarization of the green component light, not relying on applied voltage (that is, regardless of applied voltage). In contrast, the polarization adjusting element adjusts polarization of the yellow component light in accordance with the switching between the high voltage applied state and the low voltage applied state, and transmits the yellow component light.

A controller controls a voltage to be applied to the polarization adjusting element. Specifically, the controller adjusts polarization of the yellow component light, through application of a high voltage or a low voltage. The controller performs re-orienting operation of applying a high voltage to the polarization adjusting element, at predetermined timing.

According to the configuration, the green component light and the yellow component light emitted from the polarization adjusting element are guided to the green imager side. The lights emitted from the green imager are guided to a color combining unit. Thus, even when a projection display apparatus utilizes a yellow component light, in addition to a red component light, a green component light, and a blue component light, it is three kinds of lights that enter the color combining unit. Consequently there is no need to change a design of projection unit, and an increase in cost of the entire apparatus can be prevented.

In addition, the light amount of the yellow component light to be guided to a cross dichroic cube 60 is controlled in accordance with the voltage application state of the polarization adjusting element. Thus, in a case where luminance takes precedence (luminance priority mode, for example), the projection display apparatus utilizes the yellow component light. In contrast, in a case where color reproducibility takes precedence (color reproducibility priority mode, for example), the projection display apparatus does not utilize the yellow component light.

Furthermore, the controller controls the re-orienting operation of applying a high voltage to the polarization adjusting element. This prevents the polarization adjusting element from transiting to a splay orientation state, and allows the orientation state of the polarization adjusting element to be switched between a bent orientation state and an aligned orientation state. Accordingly, it is possible to improve responsiveness to the switching of the orientation state.

Secondly, the projection display apparatus according to each of the embodiments utilizes a yellow component light, in addition to a red component light, a green component light, and a blue component light. The yellow component light enters the polarization adjusting element together with the green component light. The green component light and the yellow component light emitted from the polarization adjusting element enter a green imager.

The polarization adjusting element transmits the green component light without adjusting polarization of the green component light, not relying on applied voltage (that is, regardless of applied voltage). In contrast, the polarization adjusting element adjusts the polarization of the yellow component light in accordance with the switching between the high voltage applied state and the low voltage applied state, and transmits the yellow component light.

The controller controls a voltage to be applied to the polarization adjusting element. Specifically, the controller adjusts polarization of the yellow component light through application of a voltage. In a predetermined preparation period for adjusting the condition of the polarization adjusting element, the controller applies a voltage (a low voltage or a high voltage, for example) to the polarization adjusting element. The predetermined preparation period starts when a power cable is connected to the projection display apparatus, for example.

According to the configuration, the green component light and the yellow component light emitted from the polarization adjusting element are guided to the green imager side. The lights emitted from the green imager are guided to the color combining unit. Thus, even when a projection display apparatus utilizes a yellow component light, in addition to a red component light, a green component light, and a blue component light, it is three kinds of lights that enter the color combining unit. Consequently, there is no need to change a design of projection unit, and an increase in cost of the entire apparatus can be prevented.

In addition, the light amount of the yellow component light to be guided to the cross dichroic cube 60 is controlled in accordance with the voltage application state of the polarization adjusting element. Thus, in a case where luminance takes precedence (luminance priority mode, for example), the projection display apparatus utilizes the yellow component light. In contrast, in a case where color reproducibility takes precedence (color reproducibility priority mode, for example), the projection display apparatus does not utilize the yellow component light.

Furthermore, the controller applies a voltage (a low voltage or a high voltage, for example) to the polarization adjusting element in the predetermined preparation period. Accordingly, the polarization adjusting element can be transited to the bent orientation state or the aligned orientation state in the predetermined preparation period, hence making it possible to improve responsiveness to the switching of the orientation state.

Although the yellow component light is illustrated as a fourth color component light in the embodiments, the fourth color component light is not limited to this. The fourth color component light may be a cyan component light.

Although the green component light is illustrated as a superimposed component light in the embodiments, the superimposed component light is not to be limited to this. The superimposed component light may be a red component light or a blue component light.

First Embodiment (Configuration of Projection Display Apparatus)

A projection display apparatus according to a first embodiment will be described hereinafter with reference to the drawings. FIG. 1 is a view showing a projection display apparatus 100 according to the first embodiment.

As shown in FIG. 1, the projection display apparatus 100 has a projection lens unit 110 and a lighting unit 120. As described later, the projection display apparatus 100 utilizes a yellow component light as a fourth component light, in addition to a red component light, a green component light, and a blue component light.

The projection lens unit 110 expands an image light emitted from the lighting unit 120 and projects the image light on a screen (not shown).

The lighting unit 120 includes a light source 10, a UV/IR cut filter 20, a fly-eye lens unit 30, a PBS array 40, multiple liquid crystal panels 50 (a liquid crystal panel 50R, a liquid crystal panel 50G, and a liquid crystal panel 50B), a polarization adjusting element 50Ye, and a cross dichroic cube 60.

The light source 10 is a UHP lamp emitting a white light, and the like. In other words, lights emitted from the light source 10 includes at least a red component light, a green component light, a blue component light, and a yellow component light.

The UV/IR cut filter 20 transmits visible light components (a red component light, a green component light, and a blue component light). The UV/IR cut filter 20 shields a infrared light component and an ultraviolet light component.

The fly-eye lens unit 30 equalizes the lights emitted from the light source 10. Specifically, the fly-eye lens unit 30 is formed of a fly-eye lens 30a and a fly-eye lens 30b. Each of the fly-eye lens 30a and the fly-eye lens 30b is formed of multiple micro lenses. Each micro lens collects lights emitted from the light source 10 so that the whole surfaces of the liquid crystal panels 50 would be irradiated with corresponding ones of the lights emitted from the light source 10.

The PBS array 40 aligns polarization of the lights emitted from the fly-eye lens unit 30. For example, the PBS array 40 aligns the lights emitted from the fly-eye lens unit 30 with S polarization (or P polarization).

The liquid crystal panel 50R modulates a red component light by rotating a polarization direction of the red component light. On the side where the light enters the liquid crystal panel 50R, a polarizing plate 51R is provided which transmits a light having one polarization direction (P polarization, for example) and shields a light having another polarization direction (S polarization, for example). In contrast, on the side where the light is emitted from the liquid crystal panel 50R, a polarizing plate 52R is provided which transmits the light having the other polarization direction (S polarization, for example) and shields the light having the one polarization direction (P polarization, for example).

Thus, since the red component light which has passed through the polarizing plate 51R is shielded by the polarizing plate 52R when the liquid crystal panel 50R does not rotate the polarization direction of the red component light, the cross dichroic cube 60 is not irradiated with the red component light. In contrast, since the red component light which has passed through the polarizing plate 51R passes through the polarizing plate 52R when the liquid crystal panel 50R rotates the polarization direction of the red component light, the cross dichroic cube 60 is irradiated with the red component light.

Similarly, the liquid crystal panel 50G modulates a green component light and a yellow component light by rotating polarization directions of the green component light and the yellow component light. On the side where the lights enter the liquid crystal panel 50G, a polarizing plate 51G is provided which transmits a light having one polarization direction and shields a light having another polarization direction. In contrast, on the side where the lights are emitted from the liquid crystal panel 50G, a polarizing plate 52G is provided which transmits the light having the other polarization direction and shields the light having the one polarization direction.

The liquid crystal panel 50B modulates a blue component light by rotating a polarization direction of the blue component light. On the side where the light enters the liquid crystal panel 50B, a polarizing plate 51B is provided which transmits a light having one polarization direction and shields a light having another polarization direction. In contrast, on the side where the light is emitted from the liquid crystal panel 50B, a polarizing plate 52B is provided which transmits the light having the other polarization direction and shields the light hang the one polarization direction.

Here, a compensating plate for improving a contrast ratio or a transmittance may be provided on each liquid crystal panel 50. In addition, each polarizing plate may have a pre-polarizing plate for reducing the amount of light entering the polarizing plate or a heat burden on the polarizing plate.

The polarization adjusting element 50Ye modulates a yellow component light by adjusting polarization of the yellow component light. In contrast, the polarization adjusting element 50Ye transmits a green component light without adjusting polarization of the green component light.

Specifically the polarization adjusting element 50Ye is an element capable of adjusting polarization of a linearly polarized light which has entered the polarization adjusting element 50Ye, in accordance with the state of a voltage applied to the polarization adjusting element 50Ye. The voltage application state is either one of: a no voltage applied state in which no voltage is applied, a low voltage applied state in which a low voltage is applied; and a high voltage applied state in which a high voltage is applied.

For example, in the high voltage applied state, the polarization adjusting element 50Ye directly emits a linearly polarized light without rotating the polarization direction of the linearly polarized light (yellow component light) which enters the polarization adjusting element 50Ye. In contrast, in the low voltage applied state, the polarization adjusting element 50Ye rotates approximately 90° the polarization direction of the linearly polarized light (yellow component light) entering the polarization adjusting element 50Ye, and emits the linearly polarized light the polarization direction of which is rotated almost 90°.

Through adjustment of polarization of the yellow component light by the polarization adjusting element 50Ye, the light amount of the yellow component light passing through the polarizing plate 51G provided on the light emitting side of the polarization adjusting element 50Ye is controlled.

As the polarization adjusting element 50Ye, an element of a notch filter type and an element of an edge filter type are possible.

The notch filter element can adjust polarization of only a light having a specific wavelength band. For example, the notch filter element adjusts polarization of only a light having a longer wavelength band than that of a green component light, namely, a light having a wavelength band of a yellow component light. Use of the notch filter element makes it possible to cut an unwanted light (the yellow component light, for example).

The edge filter element can adjust polarization of lights having other wavelength bands without adjusting polarization of a light having a specific wavelength band. For example, the edge filter element adjusts polarization of lights respectively having a longer wavelength band and a shorter wavelength band than that of a green component light, without adjusting polarization of the green component light. Use of the edge filter element makes it possible improve the chromatic purity of a light having a specific wavelength band (green component light, for example).

Figure 2:
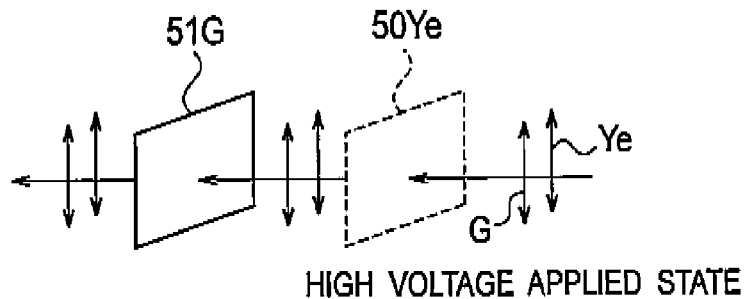
FIG. 2 is a view for explaining a polarization adjusting element 50Ye according to the first embodiment.

For example, as shown in FIG. 2, in the high voltage applied state in which a high voltage is applied to the polarization adjusting element 50Ye, the polarization adjusting element 50Ye transmits the green component light and the yellow component light without rotating the polarization directions of the green component light and the yellow component light.

Figure 3:
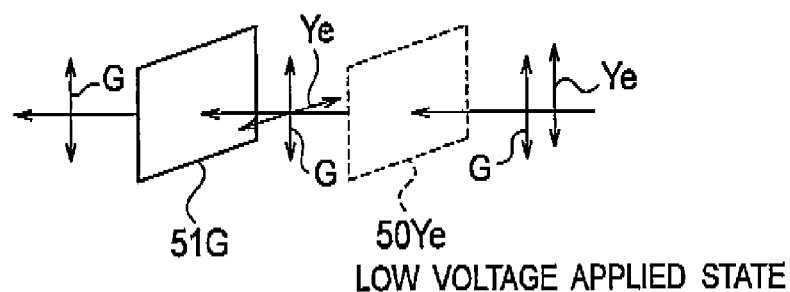
FIG. 3 is a view for explaining the polarization adjusting element 50Ye according to the first embodiment.

In contrast, as shown in FIG. 3, in the low voltage applied state in which a low voltage is applied to the polarization adjusting element 50Ye, the polarization adjusting element 50Ye rotates only the polarization direction of the yellow component light by 90° and transmits the green component light and the yellow component light.

Then, the polarizing plate 51G is irradiated with the yellow component light and the green component light emitted from the polarization adjusting element 50Ye. The polarizing plate 51G transmits a light having one polarization direction (S polarization, for example) and shields a light having another polarization direction (P polarization, for example). Thus, the light amount of the yellow component light reaching the cross dichroic cube 60 is controlled based on whether or not the polarization adjusting element 50Ye rotates the polarization direction of the yellow component light.

Figure 4:
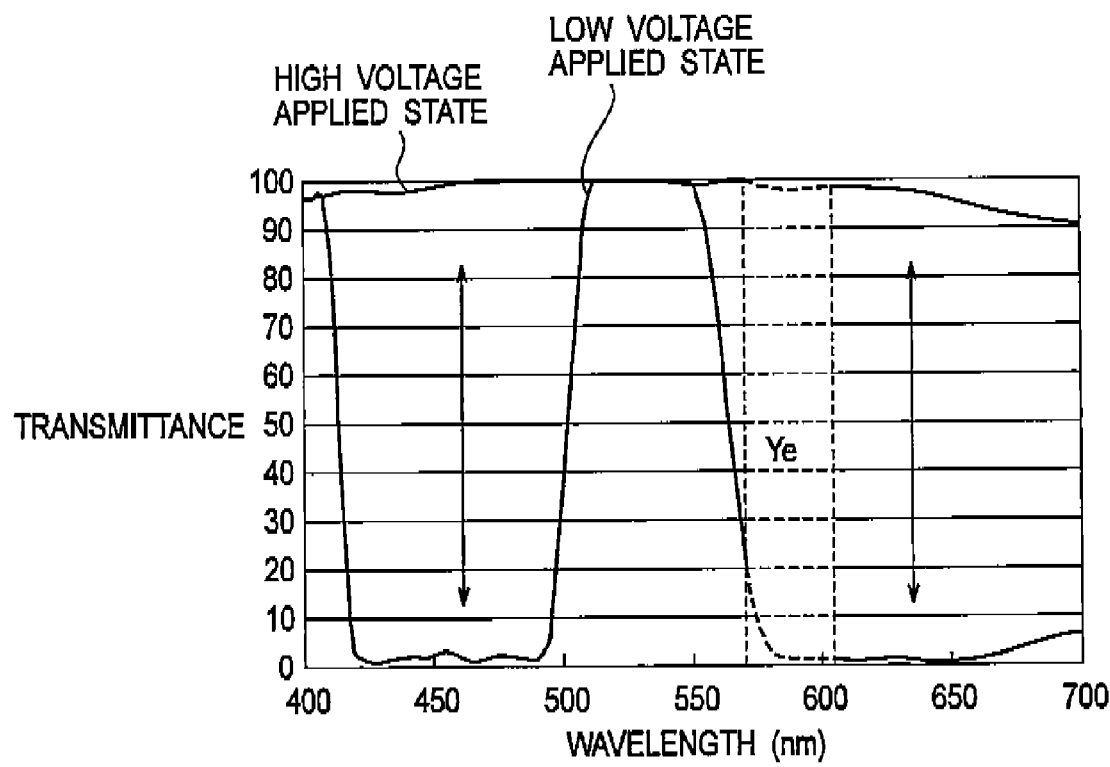
FIG. 4 is a graph for explaining the polarization adjusting element 50Ye according to the first embodiment.

Now, a case where an edge filter element is used as the polarization adjusting element 50 will be described. FIG. 4 is a graph for explaining the edge filter element according to the first embodiment. In FIG. 4, the vertical axis represents a ratio of transmitting color component lights (transmittance) without adjusting polarization of the color component lights. The higher the transmittance is, the less the polarization of the color component lights is adjusted. The lower the transmittance is, the more the polarization of the color component lights is adjusted.

As shown in FIG. 4, in the high voltage applied state in which a high voltage is applied, the polarization adjusting element 50Ye transmits the green component light and the yellow component light without adjusting polarization of the green component light and the yellow component light.

In contrast, in the low voltage applied state in which a low voltage is applied, the polarization adjusting element 50Ye adjusts polarization of the yellow component light and transmits the green component light and the yellow component light.

Figure 5:
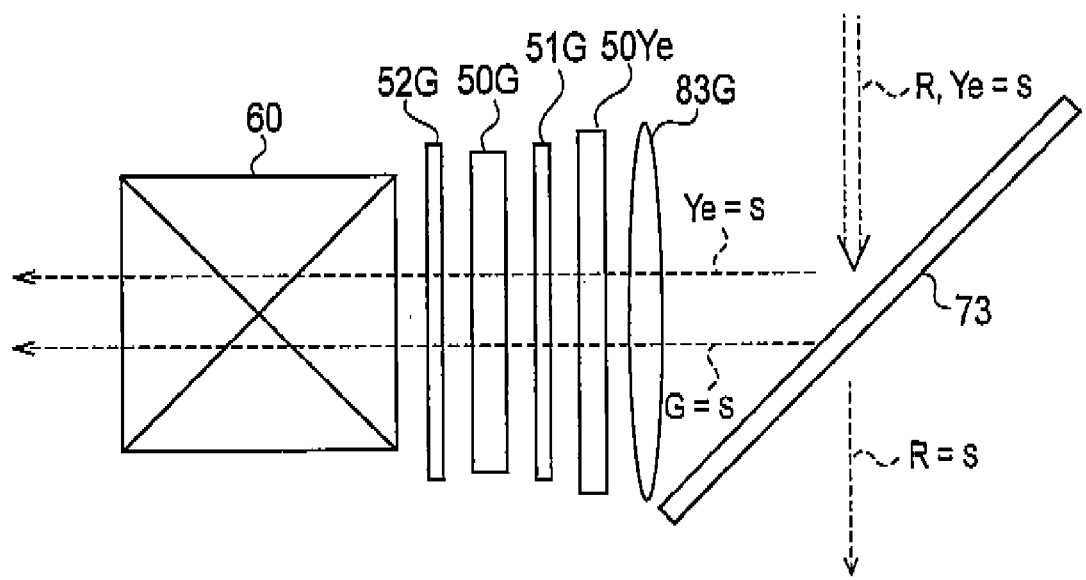
FIG. 5 is an enlarged view of the vicinity of the polarization adjusting element 50Ye according to the first embodiment.
Figure 6:
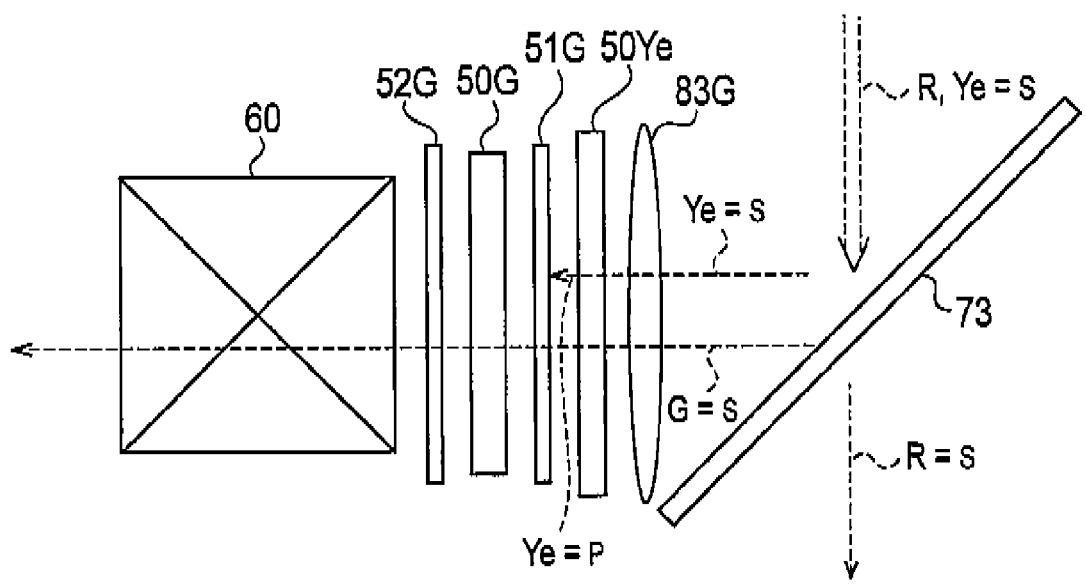
FIG. 6 is an enlarged view of the vicinity of the polarization adjusting element 50Ye according to the first embodiment.

Now, a configuration to control the light amount of the yellow component light to be directed to the cross dichroic cube 60 will be described with reference to FIG. 5 and FIG. 6. Each of FIG. 5 and FIG. 6 is an enlarged view of the vicinity of the polarization adjusting element 50Ye. FIG. 5 and FIG. 6 illustrate a case where each of color component lights is aligned with the S polarization by the PBS array 40.

As shown in FIG. 5, in the high voltage applied state, the polarization adjusting element 50Ye does not adjust polarization of the green component light and the yellow component light. Thus, the green component light and the yellow component light pass through the polarizing plate 51G.

In contrast, as shown in FIG. 6, in the low voltage applied state, the polarization adjusting element 50Ye adjusts the polarization of the yellow component light. Thus, although the green component light passes through the polarizing plate 51G, the yellow component light is shielded by the polarizing plate 51G.

The cross dichroic cube 60 combines the lights emitted from the liquid crystal panel 50R, the liquid crystal panel 50G, and the liquid crystal panel 50B. Specifically, the cross dichroic cube 60 combines the red component light emitted from the liquid crystal panel 50R, the green component light and the yellow component light emitted from the liquid crystal panel 50G, and the blue component light emitted from the liquid crystal panel 50B. Moreover, the cross dichroic cube 60 emits the combined light (image light) including the red component light, the green component light, the blue component light, and the yellow component light, to the side of the projection lens unit 110.

Now, going back to FIG. 1, the lighting unit 120 has a group of multiple mirrors mirror 71 to mirror 76). The mirror 71 is a mirror which reflects the red component light, the green component light, the blue component light, and the yellow component light. The mirror 72 is a dichroic mirror which reflects the red component light, the green component light, and the yellow component light, and transmits the blue component light. The mirror 73 is a dichroic mirror which reflects the green component light and the yellow component light, and transmits the red component light. The mirror 74 is a mirror which reflects the blue component light and guides the blue component light to the side of the liquid crystal panel 50B. The mirror 75 and the mirror 76 are mirrors which reflect the red component light and guide the red component light to the side of the liquid crystal panel 50R.

The lighting unit 120 also has a group of multiple lenses (lens 81 to lens 85). The lens 81 is a condensing lens for collecting the lights emitted from the PBS array 40. The lens 82 is a condensing lens for collecting the lights reflected by the mirror 71. The lens 83R almost collimates the red component light so that the liquid crystal panel 50R would be irradiated with the red component light. The lens 83G almost collimates the green component light so that the liquid crystal panel 50G would be irradiated with the green component light. The lens 83B almost collimates the blue component light so that the liquid crystal panel 50B would be irradiated with the blue component light. The relay lens 84 and the relay lens 85 almost form the image of the red component light on the liquid crystal panel 50R, while preventing expansion of the red component light.

(Configuration of Polarization Adjusting Element)

Figure 7:
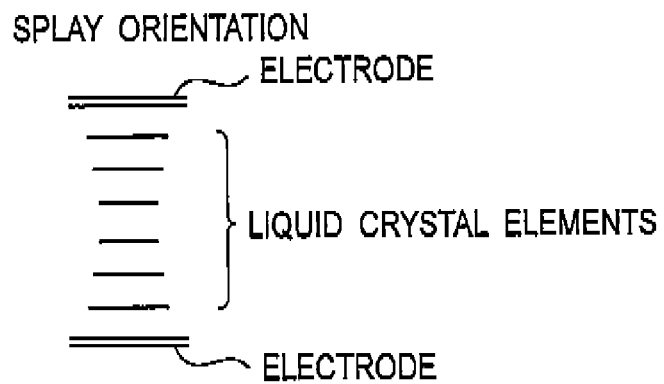
FIG. 7 is a view showing a configuration of the polarization adjusting element 50Ye according to the first embodiment.
Figure 8:
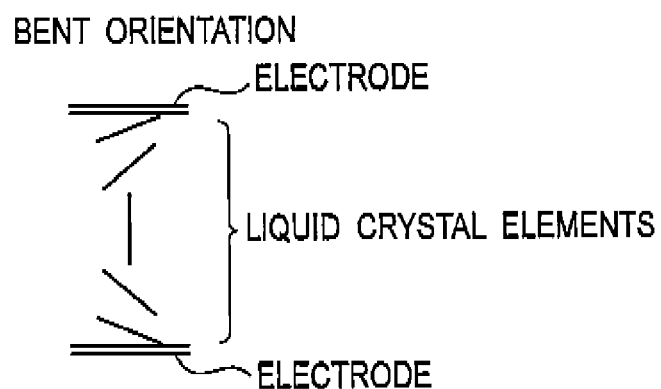
FIG. 8 is a view showing the configuration of the polarization adjusting element 50Ye according to the first embodiment.
Figure 9:
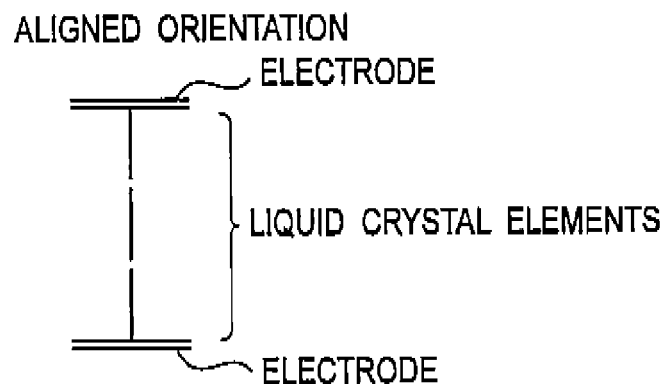
FIG. 9 is a view showing the configuration of the polarization adjusting element 50Ye according to the first embodiment.

A configuration of the polarization adjusting element according to the first embodiment will be described hereinafter with reference to the drawings. FIG. 7 to FIG. 9 are views showing the configuration of the polarization adjusting element 50Ye according to the first embodiment.

As shown in FIG. 7 to FIG. 9, the polarization adjusting element 50Ye includes a pair of electrodes and liquid crystal elements provided between the pair of electrodes. The polarization adjusting element 50Ye represents three states according to orientation of the liquid crystal elements. The three states are (a) splay orientation state, (b) bent orientation state, and (c) aligned orientation state.

As shown in FIG. 7, in (a) splay orientation state, the orientation of the liquid crystal elements is random. If no voltage is applied to the electrodes over a certain period of time, the polarization adjusting element 50Ye transits to the splay orientation state. In the no voltage applied state, the liquid crystal elements of the polarization adjusting element 50Ye represent the splay orientation.

As shown in FIG. 8, in (b) bent orientation state, the orientation of the liquid crystal elements is arched. If a low voltage is applied over a certain period of time, the polarization adjusting element 50Ye transits to the bent orientation state. In the low voltage applied state, the liquid crystal elements of the polarization adjusting element 50Ye represent the bent orientation. In the bent orientation state, the polarization of the yellow component light is adjusted.

As shown in FIG. 9, in (c) aligned orientation state, the orientation of the liquid crystal elements is aligned. If a high voltage is applied over a certain period of time, the polarization adjusting element 50Ye transits to the aligned orientation state. In the high voltage applied state, the liquid crystal elements of the polarization adjusting element 50Ye represent the aligned orientation. In the aligned orientation state, the polarization of the yellow component light is not adjusted.

The orientation of the liquid crystal elements near the center away from the pair of electrodes in the splay orientation state shown in FIG. 7 differs from the orientation in the bent orientation state shown in FIG. 8 and the aligned orientation state shown in FIG. 9. Here, the liquid crystal elements near the center are away from the pair of the electrodes. Thus, responsiveness to voltage application of the liquid crystal elements near the center is inferior to that of the liquid crystal elements in the vicinity of the electrodes.

Against such a backdrop, it should be noted that the responsiveness to a transition from the splay orientation state to the bent orientation state is poorer than the responsiveness to a transition from the bent orientation state to the aligned orientation state or the responsiveness to a transition from the aligned orientation state to the bent orientation state.

(Functions of Polarization Adjusting Element)

Functions of the polarization adjusting element according to the first embodiment will be described hereinafter with reference to the drawing. FIG. 10 is a table for explaining the functions of the polarization adjusting element (polarization adjusting element 50Ye) according to the first embodiment.

Specifically, FIG. 10 shows combinations of the polarization adjusting element 50Ye and the polarizing plate 51G. The polarization adjusting element Ye: type (1) is an element which rotates the polarization direction of only the yellow component light by 90° in the low voltage applied state. In contrast, the polarization adjusting element: type (2) is an element which rotates the polarization direction of only the yellow component light by 90° in the high voltage applied state.

In addition, the polarization adjusting element 50Ye of the type (2) has a narrow-band wave plate for adjusting the polarization of the yellow component light without relying on applied voltage. As described above, since the liquid crystal elements represent the aligned orientation in the high voltage applied state, the polarization of the yellow component light is not adjusted. However, the polarization of the yellow component light is adjusted by the narrow-band wave plate. Accordingly, the polarization direction of only the yellow component light is adjusted in the high voltage applied state.

The polarizing plate G: type (1) is an element which transmits a light having the P polarization and shields a light having the S polarization. The polarizing plate G: type (1) is used, for example, when the lights emitted from the light source 10 are aligned with the P polarization. In contrast, the polarizing plate G: type (2) is an element which transmits a light having the S polarization and shields a light having the P polarization. The polarizing plate G: type (2) is used, example, when the lights emitted from the light source 10 are aligned with the S polarization.

First, consider a case of using the polarization adjusting element Ye: type (1) when the lights emitted from the light source 10 are aligned with the P polarization. In the high voltage applied state, the light amount of the yellow component light reaching the cross dichroic cube 60 will be greatest. In contrast, since the polarization direction of the yellow component light (S polarization) differs from the polarization direction of the green component light (P polarization) in the low voltage applied state, the yellow component light of the S polarization is shielded by the polarizing plate G: type (1).

Secondly, consider a case of using the polarization adjusting element Ye: type (2) when the lights emitted from the light source 10 are aligned with the P polarization. In the low voltage applied state, the light amount of the yellow component light reaching the cross dichroic cube 60 will be greatest. In contrast, since the polarization direction of the yellow component light (S polarization) differs from the polarization direction of the green component light (P polarization) in the high voltage applied state, the yellow component light of the S polarization is shielded by the polarizing plate G: type (1).

Thirdly, consider a case of using the polarization adjusting element Ye; type (1) when the lights emitted from the light source 10 are aligned with the S polarization. In the low voltage applied state, the light amount of the yellow component light reaching the cross dichroic cube 60 will be greatest. In contrast, since the polarization direction of the yellow component light (P polarization) differs from the polarization direction of the green component light (S polarization) in the high voltage applied state, the yellow component light of the P polarization is shielded by the polarizing plate G: type (2).

Fourthly, consider a case of using the polarization adjusting type Ye: type (2) when the lights emitted from the light source 10 are aligned with the S polarization. In the high voltage applied state, the light amount of the yellow component light reaching the cross dichroic cube 60 will be greatest. In contrast, since the polarization direction of the yellow component light (P polarization) differs from the polarization direction of the green component light (S polarization) in the low voltage applied state, the yellow component light of the P polarization is shielded by the polarizing plate G: type (2).

(Functions of Projection Display Apparatus)

Figure 11:
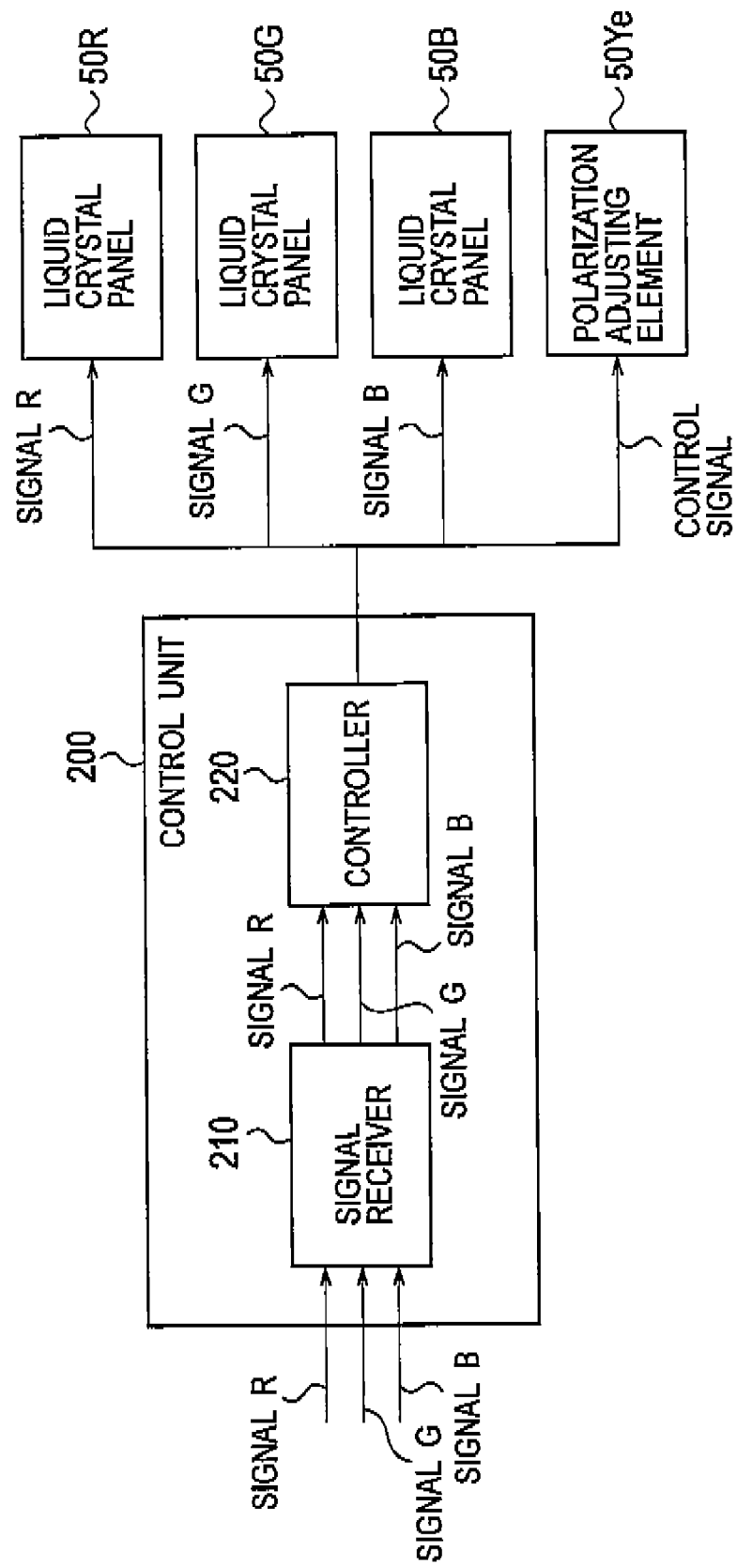
FIG. 11 is a diagram showing functions of a projection display apparatus 100 according to the first embodiment.

Functions of the projection display apparatus according to the first embodiment will be described hereinafter with reference to the drawings. FIG. 11 is a block diagram showing the functions of the projection display apparatus according to the first embodiment.

As shown in FIG. 11, the projection display apparatus 100 is provided with a control unit 200 including a signal receiver 210 and a controller 220.

The signal receiver 210 receives an image input signal. For example, the signal receiver 210 acquires color signals (a red input signal (R signal) a green input signal (G signal), and a blue input signal (B signal)) from a color separator block for separating the color signals from the image input signal.

First, the controller 220 controls the modulation amounts of the liquid crystal panels (liquid crystal panel 50R, liquid crystal panel 50G, and liquid crystal panel 50B) on the basis of the respective color signals acquired from the signal receiver 210. The controller 220 outputs the color signals to the respective liquid crystal panels.

Secondly, the controller 220 controls a voltage to be applied to the polarization adjusting element 50Ye. To the polarization adjusting element 50Ye, the controller 220 outputs a control signal for controlling the voltage to be applied the polarization adjusting element 50Ye.

Specifically, in a case where a yellow component light is used (luminance priority mode, for example), the controller 220 outputs a control signal for applying a high voltage, to the polarization adjusting element 50Ye. Accordingly, the polarization adjusting element 50Ye transits to the aligned orientation state.

In contrast, in a case where the yellow component light is not used (color reproducibility priority mode), the controller 220 outputs a control signal for applying a low voltage, to the polarization adjusting element 50Ye. Accordingly, the polarization adjusting element 50Ye transits to the bent orientation state.

Furthermore, the controller 220 controls re-orienting operation of applying a high voltage to the polarization adjusting element 50Ye. The controller 220 performs the re-orienting operation at predetermined timing. The controller 220 performs the re-orienting operation in each frame, for example.

Figure 12:
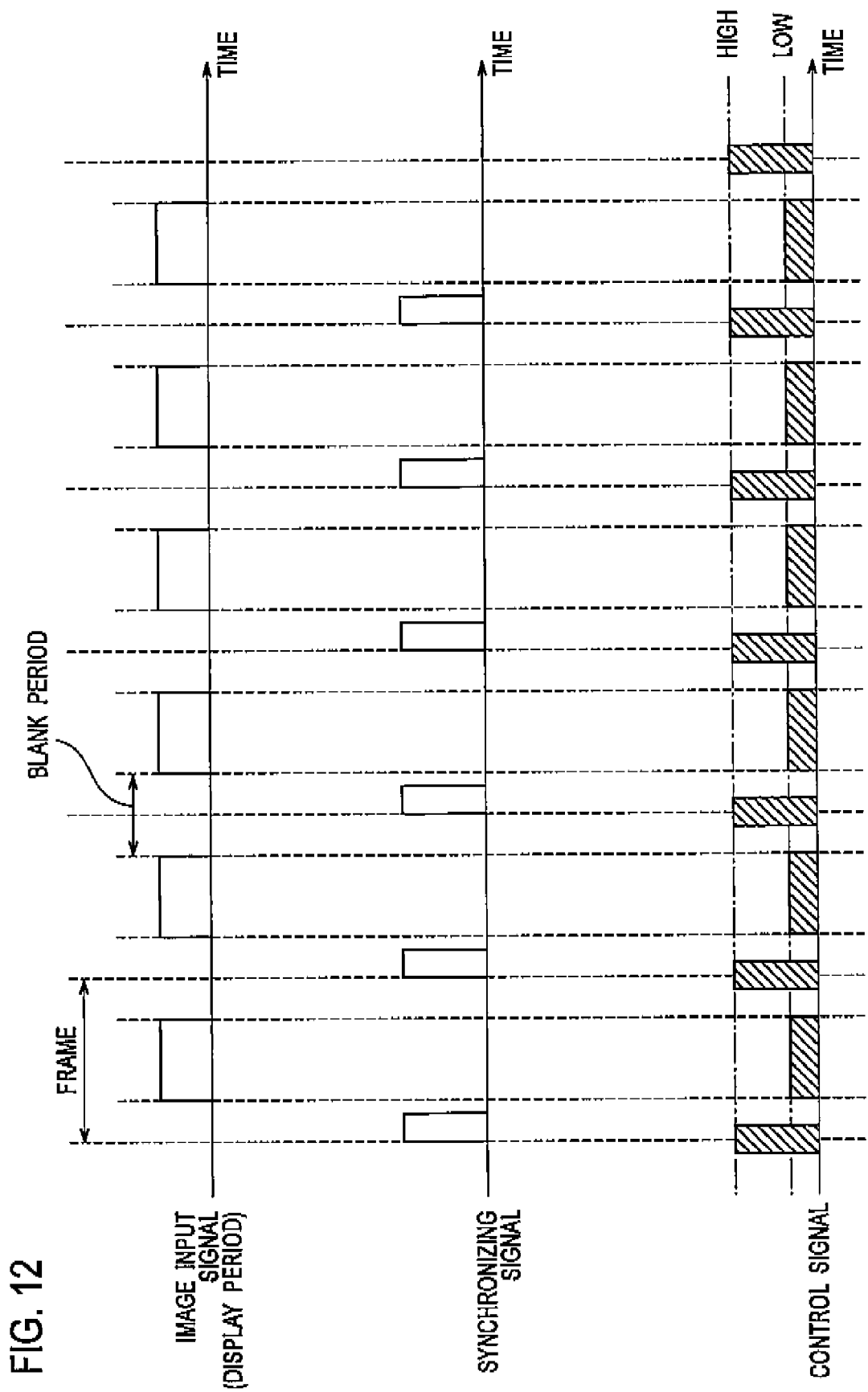
FIG. 12 is a timing diagram showing a relation of an image input signal, a synchronizing signal, and a control signal.

The timing to perform the re-orienting operation will be described hereinafter with reference to FIG. 12. FIG. 12 is a timing diagram showing a relation of an image input signal, a synchronizing signal, and a control signal. Here, the synchronizing signal is a signal for synchronizing frames.

As shown in FIG. 12, an image input signal (a red input signal, a green input signal, and a blue input signal) is inputted in each frame. In FIG. 12, the image input signal inputted in each frame indicates a period to display image (display period). A blank period is provided between the display periods of the respective frames.

A synchronizing signal is inputted in each frame. The synchronizing signal is inputted at a starting position of each frame on the time axis.

A control signal for applying a high voltage is outputted to the polarization adjusting element 50Ye in each blank period. In other words, the controller 220 performs the re-orienting operation in each frame in the blank period.

(Light Amount of Each Color Component Light)

Figure 13:
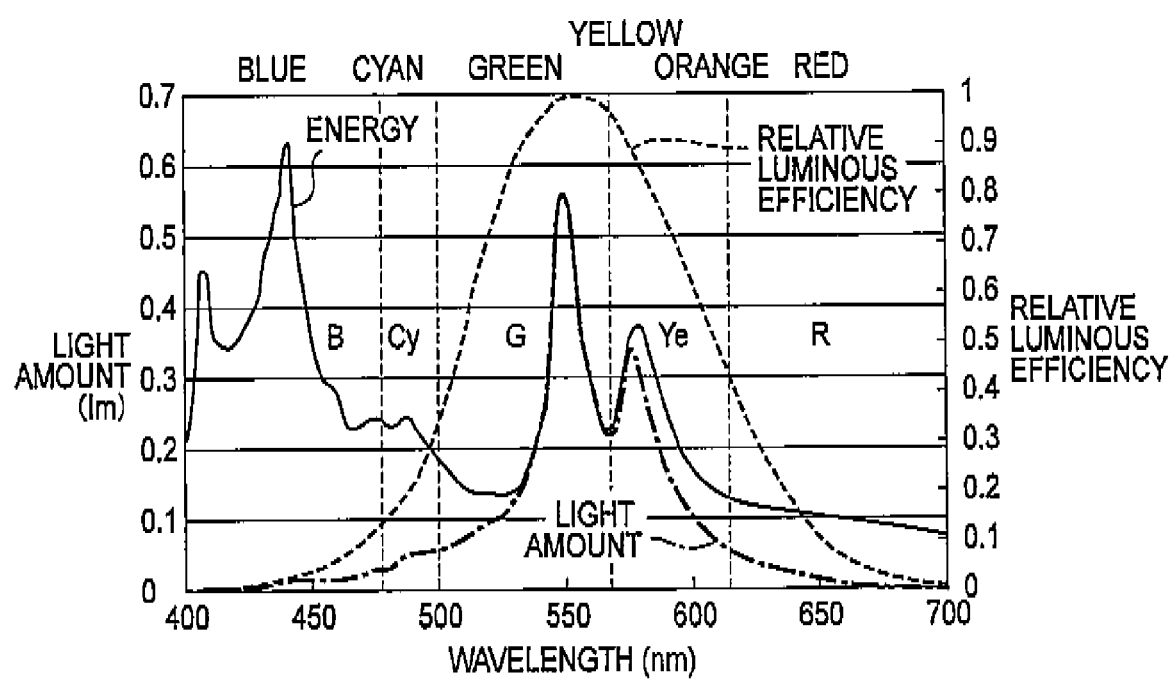
FIG. 13 is a graph showing the light amount of each color component light according to the first embodiment.

The light amount of each color component light will be described hereinafter with reference to the drawing. FIG. 13 is a graph showing the light amount of each color component light according to the first embodiment.

Here, the amount of light emitted from the light source 10 is a product of the relative luminous efficiency of the light emitted from the light source 10 and the energy generated by the light source 10. The amount of light emitted from the light source 10 has a peak in a green wavelength band and a yellow wavelength band.

As shown in FIG. 13, the relative luminous efficiency of the light emitted from the light source 10 is a ratio (relative value) of sensitivity of each wavelength to the highest sensitivity when the light energy generated by the light source 10 is same. The relative luminous efficiency of the light emitted from the light source 10 has a peak in the green wavelength band, and decreases toward longer wavelengths (or shorter wavelengths).

As can be seen from characteristics of the light emitted from the light source 10, in order to improve the luminance of an image to be projected onto a screen (not shown) or the like, it is preferable to utilize a light having a yellow wavelength band (a yellow component light), in addition to a light having a red wavelength band (a red component light), a light having a green wavelength band (a green component light), and a light having a blue wavelength band (a blue component light).

(Advantageous Effects)

In the first embodiment, the green component light and the yellow component light emitted from the polarization adjusting element 50Ye are guided to the side of the liquid crystal panel 50G. The lights emitted from the liquid crystal panel 50G are guided to the cross dichroic cube 60. Thus, even when a projection display apparatus utilizes the yellow component light in addition to the red component light, the green component light, and the blue component light, it is three kinds of lights that enter the cross dichroic cube 60. Accordingly, there is no need to change a design of the projection lens unit 110, and an increase in cost of the entire apparatus can be prevented.

In the first embodiment, the polarization adjusting element 50Ye transmits the green component light without adjusting polarization of the green component light, not relying on applied voltage (that is, regardless of applied voltage). In contrast, the polarization adjusting element 50Ye adjusts the polarization of the yellow component light in accordance with the voltage application state, and transmits the yellow component light. The light amount of the yellow component light to be guided to the cross dichroic cube 60 is controlled based on whether the polarization of the yellow component light is aligned with the polarization of the green component light. Hence, in a case where luminance takes precedence (luminance priority mode, for example), the projection display apparatus utilizes the yellow component light by controlling a voltage to be applied to the polarization adjusting element 50Ye. In contrast, in a case where color reproducibility takes precedence (color reproducibility priority mode, for example), the projection display apparatus does not utilize the yellow component light by controlling the voltage to be applied to the polarization adjusting element 50Ye.

In the first embodiment, the controller 220 controls re-orienting operation of applying a high voltage to the polarization adjusting element 50Ye. Specifically, the control unit 220 performs the re-orienting operation in each frame in a blank period. This prevents the polarization adjusting element 50Ye from transiting to a splay orientation state, and allows the orientation state of the polarization adjusting element 50Ye between the bent orientation state and the aligned orientation state. Accordingly, it is possible to improve responsiveness to switching of the orientation state.

[Modification 1]

A modification 1 of the first embodiment will be described hereinafter with reference to the drawings. In the following, differences from the first embodiment will be mainly described.

In the modification 1, as the polarization adjusting element 50Ye, used is an element which rotates a polarization direction of only the yellow component light by 90° in the low voltage applied state (type (1) shown in FIG. 10). That is, in the high voltage applied state, polarization of the yellow component light is aligned with polarization of the green component light.

The controller 220 performs the re-orienting operation at the following timings rather than performing the re-orienting operation in each frame. Specifically, the controller 220 performs the re-orienting operation in a frame where luminance should take precedence, when the low voltage applied state lasts more than a predetermined period of time.

The frames where luminance should take precedence are frames having higher luminance than predetermined luminance, frames having lower chroma saturation than predetermined chroma saturation, or the like.

(Advantageous Effects)

In the modification 1, the controller 220 performs the re-orienting operation in the frames where luminance should take precedence, when the low voltage applied state lasts more than a predetermined period of time. The controller 220 can perform the re-orienting operation while controlling adverse effects attributable to superposition (utilization) of the yellow component light due to the application of a high voltage. In addition, compared with the case of performing the re-orienting operation in each frame, a processing load and the like on the controller 220 are alleviated.

[Modification 2]

A modification 2 of the first embodiment will be described hereinafter with reference to the drawings. In the following, differences from the first embodiment will be mainly described.

In the modification 2, as the polarization adjusting element 50Ye, used is an element which rotates a polarization direction of only the yellow component light by 90° in the high voltage applied state (type (2) shown in FIG. 10). That is, in the low voltage applied state, polarization of the yellow component light is aligned with polarization of the green component light.

The controller 220 performs re-orienting operation at the following timings rather than performing the re-orienting operation in each frame. Specifically, the controller 220 performs the re-orienting operation in a frame where color reproducibility should take precedence, when the low voltage applied state lasts more than a predetermined period of time.

The frames where color reproducibility should take precedence are frames having lower luminance than predetermined luminance, frames having higher chroma saturation than predetermined chroma saturation, or the like.

(Advantageous Effect)

In the modification 2, the controller 220 performs the re-orienting operation in the frames where color reproducibility should take precedence, when the low voltage applied state lasts more than a predetermined period of time. The controller 220 can perform the re-orienting operation while controlling adverse effects attributable to shading (non-utilization) of the yellow component light due to the application of a high voltage. In addition, compared with the case of performing the re-orienting operation in each frame, a processing load and the like on the controller 220 are alleviated.

Second Embodiment

A projection display apparatus according to a second embodiment will be described hereinafter with reference to the drawings. It should be noted that in the following, a description of a configuration similar to the first embodiment will be omitted. In other words, differences from the first embodiment will be mainly described.

(Functions of Projection Display Apparatus)

Figure 14:
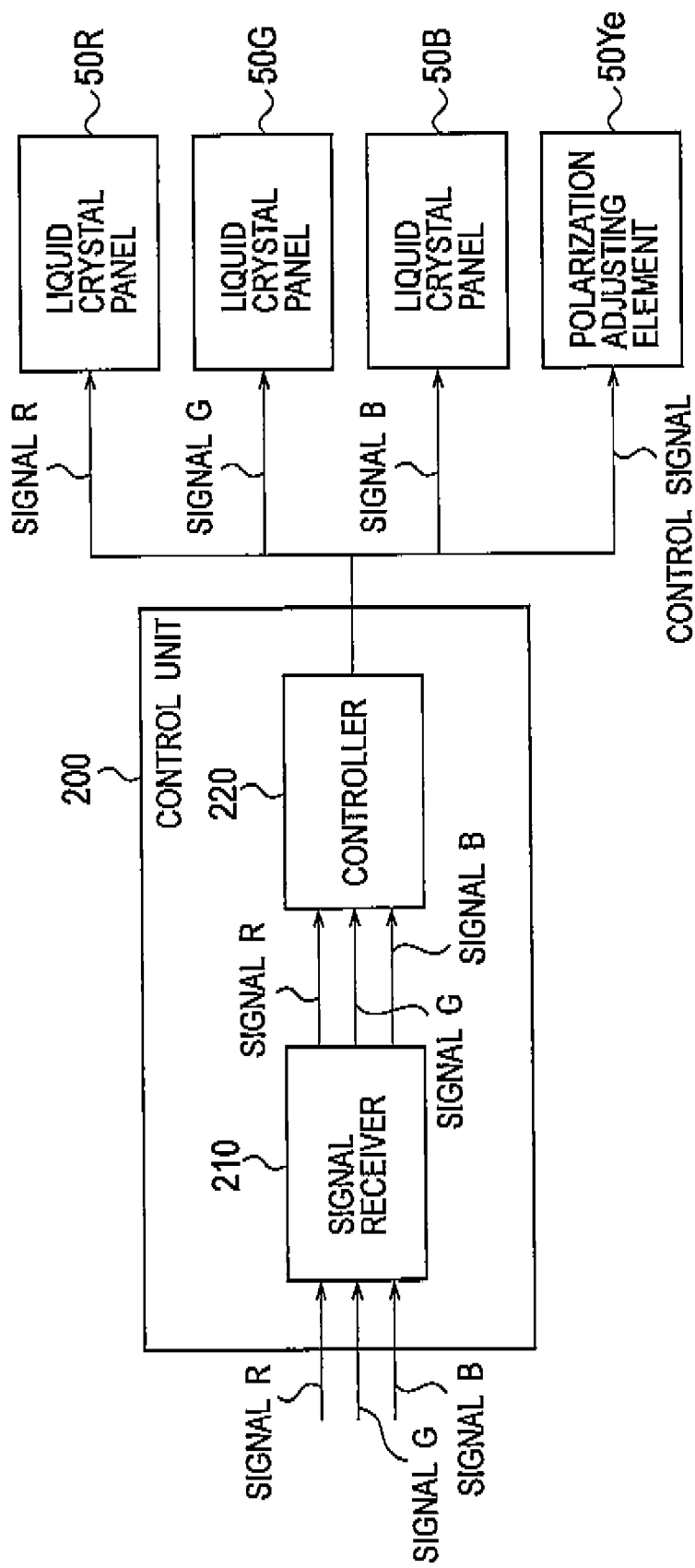
FIG. 14 is a diagram showing functions of a projection display apparatus 100 according to a second embodiment.

Functions of the projection display apparatus according to the second embodiment will be described hereinafter with reference to the drawings. FIG. 14 is a block diagram showing the functions of the projection display apparatus 100 according to the second embodiment.

As shown in FIG. 14, the projection display apparatus 100 is provided with the control unit 200 including the signal receiver 210 and the controller 220.

The signal receiver 210 receives an image input signal. For example, the signal receiver 210 acquires color signals (a red input signal (R signal), a green input signal (G signal, and a blue input signal (B signal)) from a color separator block for separating the color signals from the image input signal.

First, the controller 220 controls the modulation amounts of the liquid crystal panels (liquid crystal panel 50R, liquid crystal panel 50G, and liquid crystal panel 50B) on the basis of the respective color signals acquired from the signal receiver 210. The controller 220 outputs the color signals to the respective liquid crystal panels.

Secondly, the controller 220 controls a voltage to be applied to the polarization adjusting element 50Ye. The controller 220 outputs a control signal for controlling the voltage to be applied, to the polarization adjusting element 50Ye.

Specifically, in a case where a yellow component light is used (luminance priority mode, for example), the controller 220 outputs a control signal for applying a high voltage, to the polarization adjusting element 50Ye. Accordingly, the polarization adjusting element 50Ye transits to the aligned orientation state.

In contrast, in a case where the yellow component light is not used (color reproducibility priority mode), the controller 220 outputs a control signal for applying a low voltage, to the polarization adjusting element 50Ye. Accordingly, the polarization adjusting element 50Ye transits to the bent orientation state.

Furthermore, the controller 220 applies a voltage (a high voltage or a low voltage, for example) to the polarization adjusting element 50Ye in a predetermined preparation period for adjusting the condition of the polarization adjusting element 50Ye. In order to reduce the predetermined preparation period, it is preferable that the voltage to be applied to the polarization adjusting element 50Ye in the predetermined preparation period be a high voltage.

Here, the controller 220 may start the predetermined preparation period when a power cable is connected to the projection display apparatus 100. Alternatively, the controller 220 may start the predetermined preparation period when power of the projection display apparatus 100 is turned on.

Together with the use of the predetermined preparation period, the controller 220 may further perform a first control or a second control described below. For example in the predetermined preparation period, the first control is used in a mode (standby mode) in which images (input images) are not displayed on the basis of an input image signal. In contrast, for example, in the predetermined preparation period, the second control is used in a mode (immediate mode) in which images (input images) are displayed on the basis of an input image signal.

In the first control, in the predetermined preparation period, the controller 220 performs standby display indicating that the projection display apparatus 100 in the predetermined preparation period, by using lights emitted from at least one of imagers, namely, the liquid crystal panel 50R, the liquid crystal panel 50G, and the liquid crystal panel 50B. The standby display is to display a character string "In Preparation", for example.

Additionally, in the standby display, it is preferable to use any color component light other than the yellow component light. Furthermore, in the standby display, it is preferable to use any color component light other than the yellow component light and the green component light (superimposed component light).

In the second control, in a predetermined conditioning period following the predetermined preparation period, the controller 220 gradually increases the dimming width of the yellow component light. The dimming width of the yellow component light is a difference between the light amount of the yellow component light to be emitted from the liquid crystal panel 50G in the low voltage applied state and the light amount of the yellow component light to be emitted from the liquid crystal panel 50G in the high voltage applied state.

Figure 15:
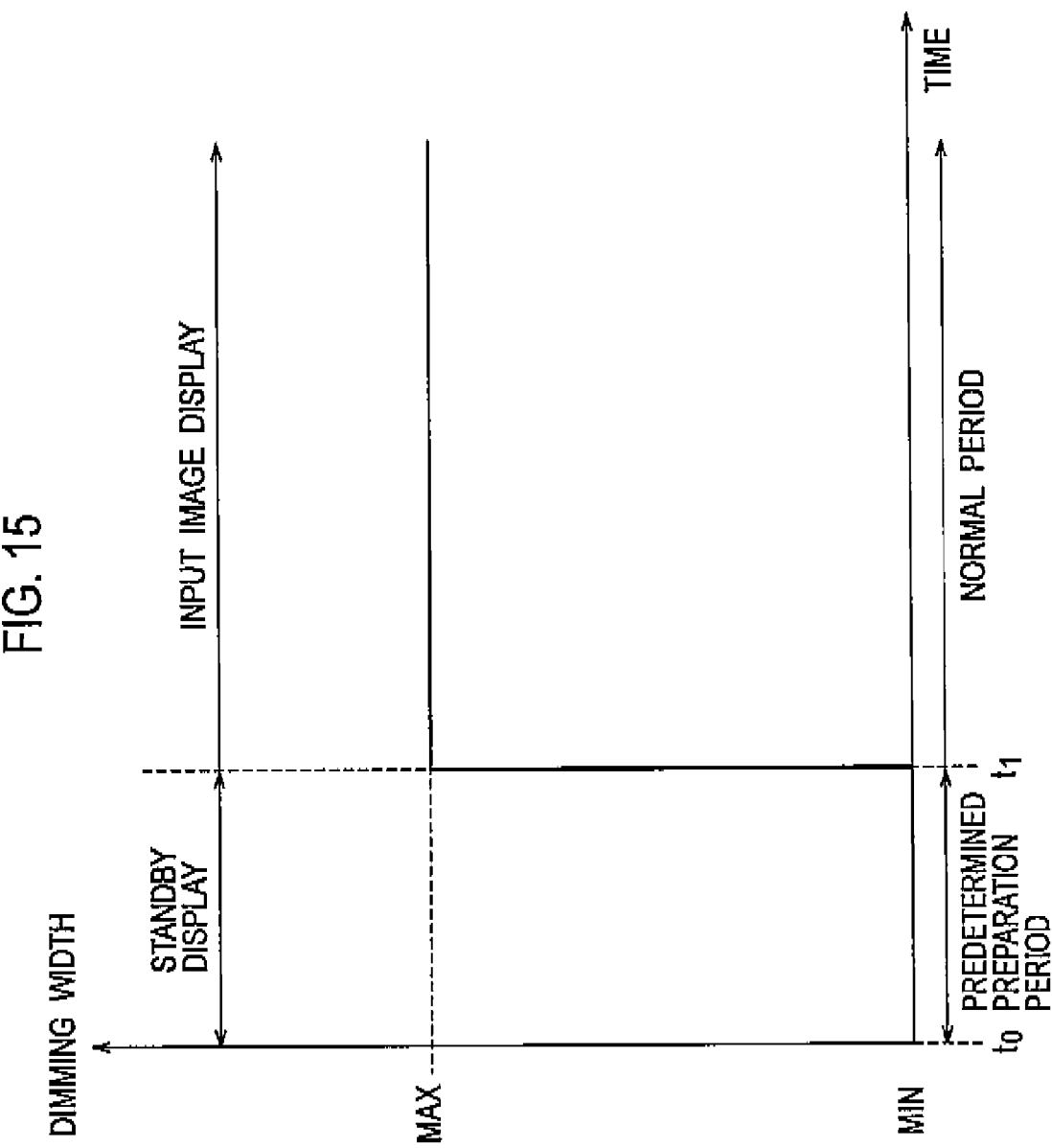
FIG. 15 is a graph showing the dimming width of a yellow component light according to the second embodiment.
Figure 16:
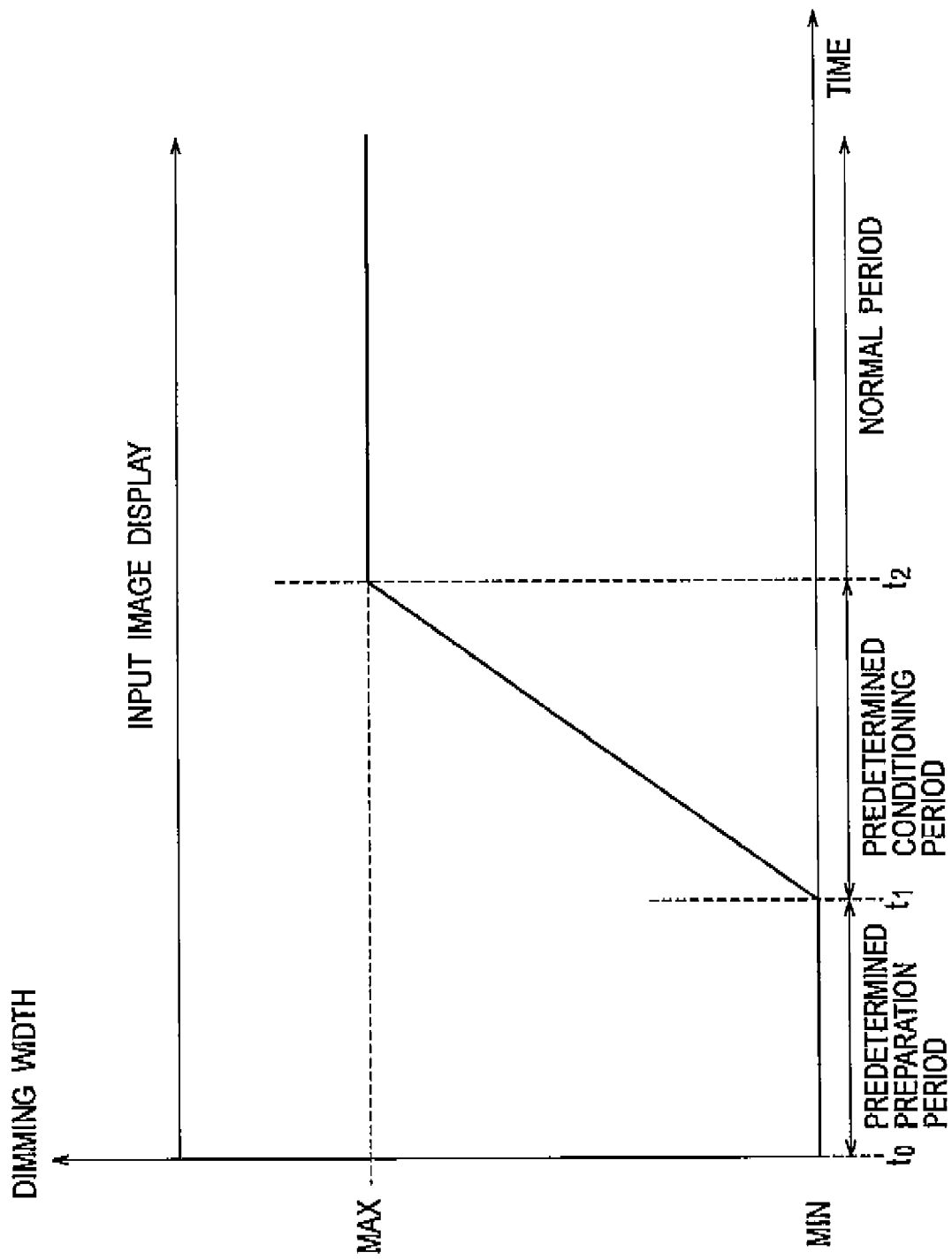
FIG. 16 is a graph showing the dimming width of the yellow component light according to the second embodiment.

The dimming width of the yellow component light will be described hereinafter with reference to FIG. 15 and FIG. 16. FIG. 15 and FIG. 16 are graphs each showing the dimming width of the yellow component light according to the second embodiment.

First, the above-mentioned first control will be described hereinafter with reference to FIG. 15. As shown in FIG. 15, the predetermined preparation period is a period between time $t_0$ and time $t_1$. In the predetermined preparation period, the standby display is performed by using the red component light, the blue component light, or both the red component light and the blue component light. It is preferable not to use the yellow component light and the green component light for the standby display.

Here, in the predetermined preparation period, since a voltage applied to the polarization adjusting element 50Ye does not vary, the dimming width of the yellow component light in the predetermined preparation period is a minimum value MIN (="0").

Note that, as shown in FIG. 15, in the first control, the standby display is performed in the predetermined preparation period, and input-image display is performed in a normal period following the predetermined preparation period. In addition, the dimming width of the yellow component light in the normal period is a maximum value MAX.

Secondly, the above-mentioned second control will be described with reference to FIG. 16. As shown in FIG. 16, the predetermined preparation period is a period between time $t_0$ and time $t_1$. Since a voltage applied to the polarization adjusting element 50Ye does not vary in the predetermined preparation period, the dimming width of the yellow component light in the predetermined preparation period is a minimum value MIN (="0").

A predetermined conditioning period following the predetermined preparation period is a period between time $t_1$ and time $t_2$. The dimming width of the yellow component light gradually increases in the predetermined conditioning period. The dimming width of the yellow component light is controlled by an upper limit of a voltage to be applied to the polarization adjusting element 50Ye, for example.

Note that, as shown in FIG. 16, in the second control, the input-images display is performed in the predetermined preparation period. In addition, the dimming width of the yellow component light in the normal period is a maximum value MAX.

If the dimming width of the yellow component light is set to the maximum value MAX without providing a predetermined conditioning period after a predetermined preparation period, the following problems occur.

First, suppose a case where the yellow component light has reached the cross dichroic cube 60 in the predetermined preparation period. In such a case, when images not using the yellow component light are displayed at the end of the predetermined preparation period, the images become darker abruptly because the light amount of the yellow component light at the end of the predetermined preparation period significantly decreases.

Secondly, suppose a case where the yellow component light has not reached the cross dichroic cube 60 in the predetermined preparation period. In such a case, when images using the yellow component light are displayed at the end of the predetermined preparation period, the images become brighter abruptly because the light amount of the yellow component light at the end of the predetermined preparation period significantly increases.

In the second control, however, since the dimming width of the yellow component light gradually increases in the predetermined conditioning period, such problems can be avoided.

(Advantageous Effects)

In the second embodiment, the green component light and the yellow component light emitted from the polarization adjusting element 50Ye are guided to the side of the liquid crystal panel 50G. The lights emitted from the liquid crystal panel 50G are guided to the cross dichroic cube 60. Thus, even when a projection display apparatus utilizes the yellow component light, in addition to the red component light, the green component light, and the blue component light, it is three lids of lights that enter the cross dichroic cube 60. Accordingly, there is no need to change a design of the projection lens unit 110, and an increase in cost of the entire apparatus can be prevented.

In the second embodiment, the polarization adjusting element 50Ye transmits the green component light without adjusting polarization of the green component light, regardless of applied voltage. In contrast, the polarization adjusting element 50Ye adjusts the polarization of the yellow component light in accordance with the voltage application state, and transmits the yellow component light. The light amount of the yellow component light to be guided to the cross dichroic cube 60 is controlled based on whether the polarization of the yellow component light is aligned with the polarization of the green component light. Hence, in a case where luminance takes precedence (luminance priority mode, for example), the projection display apparatus utilizes the yellow component light by controlling a voltage to be applied to the polarization adjusting element 50Ye. In contrast, in a case where color reproducibility takes precedence (color reproducibility priority mode, for example), the projection display apparatus does not utilize the yellow component light by controlling the voltage to be applied to the polarization adjusting element 50Ye.

In the second embodiment, the controller 220 applies a high voltage to the polarization adjusting element 50Ye in a predetermined preparation period. Accordingly, the polarization adjusting element 50Ye can be transited to the bent orientation state or the aligned orientation state in the predetermined preparation period, hence making it possible to improve responsiveness to the switching of the orientation state.

In the first control according to the second embodiment, the controller 20 performs the standby display in the predetermined preparation period. This makes it possible to inform the user of whether or not the yellow component light can be utilized normally.

In the first control according to the second embodiment, any color component light other than the yellow component light is used in the standby display. This makes it possible to perform the standby display without giving the user uncomfortable feeling involved in changing of the light amount of the yellow component light.

In the second control according to the second embodiment, the controller 220 gradually increases the dimming width of the yellow component light in a predetermined conditioning period following the predetermined preparation period. This can alleviate the uncomfortable feeling involved in the changing of the light amount of the yellow component light.

Third Embodiment

A third embodiment will be described hereinafter with reference to the drawings. In the third embodiment, a configuration of the above-mentioned polarization adjusting element 50Ye will be described in detail. In the third embodiment, the polarization adjusting element 50Ye has resolution. In other words, the polarization adjusting element 50Ye is formed of multiple segmented regions and the control of the voltage application state can be performed by each segmented region.

(Configuration of Imager)

Figure 17:
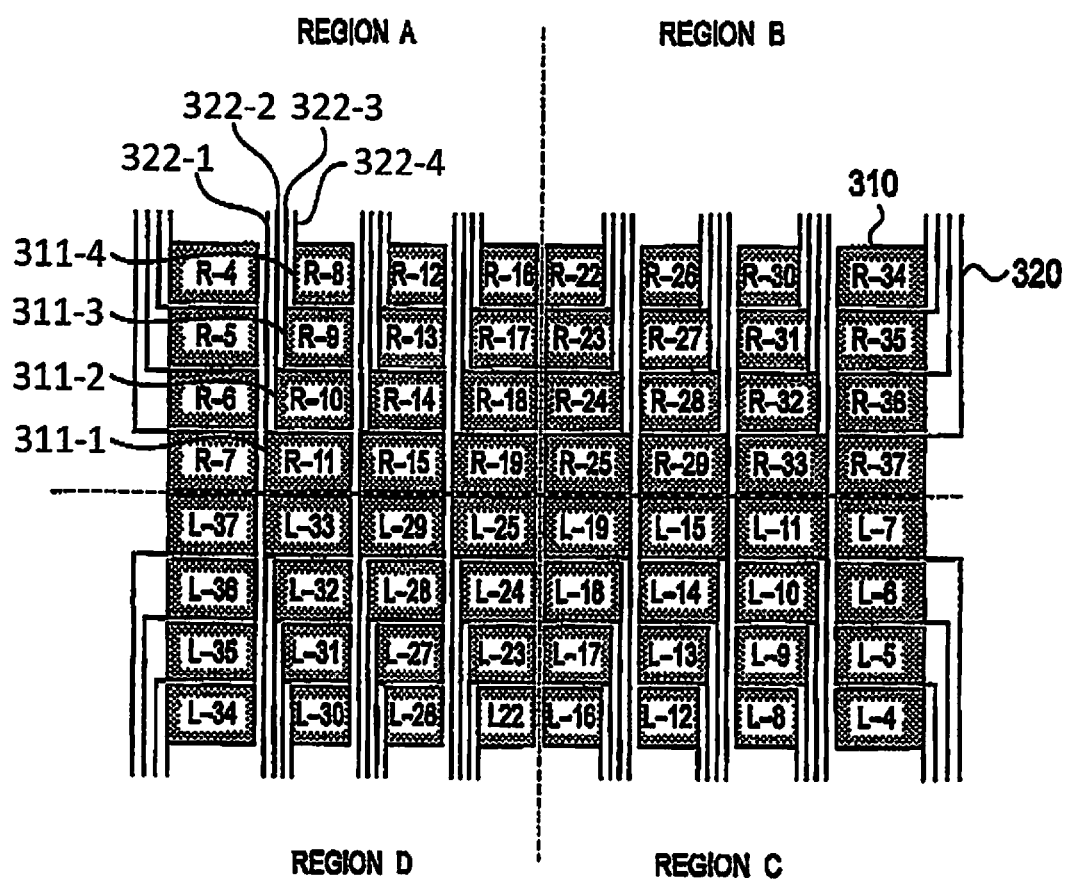
FIG. 17 is a view showing a configuration of a polarization adjusting element 50Ye according to a third embodiment.

A configuration of an imager according to the third embodiment will be described hereinafter with reference to the drawings. FIG. 17 is a view showing the configuration of the polarization adjusting element 50Ye according to the third embodiment. FIG. 17 is a view of the polarization adjusting element 50Ye when it is viewed from the side of a light incidence surface (or a light emitting surface) of the polarization adjusting element 50Ye.

As shown in FIG. 17, the polarization adjusting element 50Ye has multiple segments 310 and multiple transparent electrodes 320.

The segments 310 are arranged in a matrix and can be considered as four regions (Region A to Region D).

In the regions (Region A and Region B) provided on the upper half of the polarization adjusting element 50Ye, the areas of the segments 310 become smaller as the segments 310 are arranged closer to the top position. In contrast, in the regions (Region C and Region D) provided in the lower half of the polarization adjusting element 50Ye, the areas of the segments 310 become smaller as the segments 310 are arranged closer to the bottom position.

Meanwhile, in the regions (Region A and Region D) provided in the left half of the polarization adjusting element 50Ye, the transparent electrodes 320 are provided in the left side of the respective segments 310. In the regions (Region 13 and Region C) provided in the right half of the polarization adjusting element 50Ye, the transparent electrodes 320 are provided in the right side of the respective segments 310.

Now, configurations of the segments 310 will be described further in detail by taking segments 311-1 to 311-4 as an example.

The area of the segment 311-2 provided above the segment 311-1 is smaller than the area of the segment 311-1 by the width of a transparent electrode 322-1 connected to the segment 311-1.

The area of the segment 311-3 provided above the segment 311-2 is further smaller than the area of the segment 311-2 by the width of a transparent electrode 322-2 connected to the segment 311-2. In other words, the area of the segment 311-3 is smaller than the area of the segment 311-1 by the widths of the transparent electrode 322-1 and the transparent electrode 322-2.

The area of the segment 311-4 provided above the segment 311-3 is further smaller than the area of the segment 311-3 by the width of the transparent electrode 322-3 connected to the segment 311-3. In other words, the area of the segment 311-4 is smaller than the area of the segment 311-1 by the widths of the transparent electrode 322-1 to the transparent electrode 322-3.

The transparent electrodes 320 are formed of transparent members, and connected to the respective segments 310. In addition, the transparent electrodes 320 are provided in a space freed by the reduction of the areas of the segments 310.

In the regions (Region A and Region B) provided on the upper half of the polarization adjusting element 50Ye, the respective transparent electrodes 320 are connected to an FPC (Flexible Printed Circuit) (not shown) provided on the upper side of the polarization adjusting element 50Ye. In the regions (Region C and Region D) provided on the lower half of the polarization adjusting element 50Ye, the transparent electrodes 320 are connected to an FPC (not shown) provided on the lower side of the polarization adjusting element 50Ye.

It is to be noted that, although the case where the FPCs are provided on the upper and lower sides of the polarization adjusting element 50Ye is illustrated in the third embodiment, the configuration is not limited to this. Specifically, the FPCs may be provided respectively on the right and left sides of the polarization adjusting element 50Ye. In this case, it is needless to say that the configuration shown in FIG. 17 is to be rotated 90°.

In addition, in the third embodiment, although the polarization adjusting element 50Ye is shown as an example of the imager having the configuration shown in FIG. 17, each of the liquid crystal panels 50 can of course have the configuration shown in FIG. 17.

(Advantageous Effects)

In the third embodiment, in a case where it is not preferable to extend the transparent electrodes 320 in a thickness direction of the polarization adjusting element 50Ye, in other words, in a case where it is preferable to extend the transparent electrodes 320 in the light incidence surface tight emitting surface), the space in which the transparent electrodes 320 are provided can be efficiently reduced. In other words, a ratio of each segment 310 in the polarization adjusting element 50Ye increases, and thus a sufficient effect of modulation by the segments 310 can be achieved.

Use of the transparent electrodes 320 as electrodes connected to the segments 310 can prevent light use efficiency by the electrodes from dropping.

Provision of the FPCs on the upper and lower sides of the polarization adjusting element 50Ye shortens the lengths of the transparent electrodes 320, thereby to reduce electric resistance of the transparent electrodes 320 and to narrow the widths of the transparent electrodes 320.

Other Embodiments

The present invention has been described through the embodiments described above. However, it should not be understood that the description and the drawings constituting a part of this disclosure limit the present invention. Various alternative embodiments, examples, and operating techniques will become apparent to those skilled in the art from this disclosure.

For example, in the embodiments described above, the superimposed component light to be superimposed on the yellow component light is the green component light, but it should not be limited to this. The superimposed component light to be superimposed on the yellow component light may be a red component light. In this case, the red component light enters the polarization adjusting element 50Ye together with the yellow component light. However, it should be noted that since yellow is a complementary color of blue, it is preferable that the superimposed component light to be superimposed on the yellow complement light be not the blue component light.

In the embodiments described above, the fourth color component light is the green component light, but it is not limited to this. The fourth color component light may be a cyan component light, or the like. Specifically, it is preferable that the superimposed component light to be superimposed on the cyan component light be the green component light or the blue component light.

In the embodiments described above, the fourth color component light is a single color component light, but it is not limited to this. The fourth color component light may be made of multiple color component lights.

In the embodiments described above, it is assumed that the polarization adjusting element 50Ye is a polarization adjusting element having no resolution, but it is not limited to this. Specifically, the polarization adjusting element may be a fourth color liquid crystal panel having resolution. In this case, in order to prevent the transmittance from dropping due to the electrodes or the like, it is preferable that the resolution of the fourth color liquid crystal panel be lower than resolution of the liquid crystal panel 50R, the liquid crystal panel 50G, and the liquid crystal panel 50B. It should be noted, however, that the resolution of the fourth color liquid crystal panel may be equivalent to the resolution of the liquid crystal panel 50R, the liquid crystal panel 50G, and the liquid crystal panel 50B.

As the polarization adjusting element according to the embodiments described above, OCB (Optical Compensated Bend) liquid crystal may be used. In addition, as the polarization adjusting element, VA (Vertical Alignment) liquid crystal or TN (Twisted Nematic) liquid crystal may be used.

Incidentally, in the case where the VA liquid crystal or the TN liquid crystal is used, a voltage in the low voltage applied state may be 0V. In other words, the low voltage applied state is a state in which no voltage is applied.

What is claimed is:

1. A projection display apparatus comprising:
a red imager configured to modulate a red component light according to a red input signal;
a green imager configured to modulate a green component light according to a green input signal;
a blue imager configured to modulate a blue component light according to a blue input signal;
a polarization adjusting element configured to adjust polarization of a fourth color component light;
a color combining unit configured to combine lights emitted respectively from the red imager, the green imager, and the blue imager; and
a controller configured to control a voltage to be applied to the polarization adjusting element, wherein
a superimposed component light, which is any one of the red component light, the green component light, and the blue component light, enters the polarization adjusting element together with the fourth color component light,
the polarization adjusting element transmits the superimposed component light, whereas transmitting the fourth color component light by adjusting the polarization of the fourth color component light in accordance with switching between a low voltage applied state and a high voltage applied state of the polarization adjusting element, and
the controller controls re-orienting operation of applying a high voltage to the polarization adjusting element, wherein
the superimposed component light and the fourth color component light emitted from the polarization adjusting element enter a specific imager which is one of the red imager, the green imager, and the blue imager corresponding to the superimposed component light,
in the high voltage applied state, the polarization of the fourth color component light entering the specific imager is aligned with the polarization of the superimposed component light, and
when the low voltage applied state lasts more than a predetermined period of time, the controller performs the re-orienting operation in a frame where luminance should take precedence over color reproducibility.

2. A projection display apparatus comprising:
a red imager configured to modulate a red component light according to a red input signal;
a green imager configured to modulate a green component light according to a green input signal;
a blue imager configured to modulate a blue component light according to a blue input signal;

a polarization adjusting element configured to adjust polarization of a fourth color component light;

a color combining unit configured to combine lights emitted respectively from the red imager, the green imager, and the blue imager; and a controller configured to control a voltage to be applied to the polarization adjusting element, wherein a superimposed component light, which is any one of the red component light, the green component light, and the blue component light, enters the polarization adjusting element together with the fourth color component light, the polarization adjusting element transmits the superimposed component light, whereas transmitting the fourth color component light by adjusting the polarization of the fourth color component light in accordance with switching between a low voltage applied state and a high voltage applied state of the polarization adjusting element, and the controller controls re-orienting operation of applying a high voltage to the polarization adjusting element, wherein the superimposed component light and the fourth component light emitted from the polarization adjusting element enter a specific imager which is one of the red imager, the green imager, and the blue imager corresponding to the superimposed component light, in the high voltage applied state, the polarization of the fourth color component light entering the specific imager differs from the polarization of the superimposed component light, and when the low voltage applied state lasts more than a predetermined period of time, the controller performs the re-orienting operation in a frame where color reproducibility should take precedence over luminance.

3. The projection display apparatus according to any one of claims 1 and 2, wherein:

the controller applies a voltage to the polarization adjusting element in a predetermined preparation period for adjusting a condition of the polarization adjusting element.

4. The projection display apparatus according to claim 3, wherein, in the predetermined preparation period, the controller performs standby display indicating that the projection display apparatus is in the predetermined preparation period, by using a color component light emitted from at least one of the red imager, the green imager, and the blue imager.

5. The projection display apparatus according to claim 4, wherein any of the color component lights other than the fourth color component light is used for the standby display.

6. The projection display apparatus according to claim 3, wherein the superimposed component light and the fourth component light emitted from the polarization adjusting element enter a specific imager which is one of the red imager, the green imager, and the blue imager corresponding to the superimposed component light, the controller gradually increases a dimming width of the fourth color component light in a predetermined conditioning period following the predetermined preparation period, and the dimming width of the fourth color component light is a difference between a light amount of the fourth color component light emitted from the specific imager in the low voltage applied state and a light amount of the fourth color component light emitted from the specific imager in the high voltage applied state.

7. The projection display apparatus according to claim 3, wherein the controller starts the predetermined preparation period when a power cable for supplying power is connected to the projection display apparatus.

8. The projection display apparatus according to claim 1, wherein the red input signal, the green input signal, and the blue input signal are inputted in each frame, and the controller performs the re-orienting operation in each frame.

9. The projection display apparatus according to claim 2, wherein the red input signal, the green input signal, and the blue input signal are inputted in each frame, and the controller performs the re-orienting operation in each frame.

* * * * *